United States Patent
Volkov et al.

(10) Patent No.: US 11,055,162 B2
(45) Date of Patent: Jul. 6, 2021

(54) DATABASE SYSTEM PERFORMANCE DEGRADATION DETECTION

(71) Applicant: salesforce.com, inc., San Francisco, CA (US)

(72) Inventors: Dmitry Volkov, San Francisco, CA (US); Daisuke Kawamoto, San Francisco, CA (US); Ana Bertran, San Francisco, CA (US); Lauren Valdivia, San Francisco, CA (US); Sudhish Iyer, San Francisco, CA (US); Xiaohong Huang, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 206 days.

(21) Appl. No.: 16/176,872

(22) Filed: Oct. 31, 2018

(65) Prior Publication Data

US 2020/0133760 A1 Apr. 30, 2020

(51) Int. Cl.
*G06F 11/07* (2006.01)
*G06F 9/06* (2006.01)
*G06F 11/30* (2006.01)

(52) U.S. Cl.
CPC ............ *G06F 11/0754* (2013.01); *G06F 9/06* (2013.01); *G06F 11/3062* (2013.01)

(58) Field of Classification Search
CPC .... G06F 11/0754; G06F 9/06; G06F 11/3062; G06F 11/3058; G06F 11/3051
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |

(Continued)

OTHER PUBLICATIONS

Patcha, Animesh et al., "An overview of anomaly detection techniques: Existing solutions and latest technological trends", Feb. 16, 2007, Elsevier, Computer Networks 51, pp. 3448-3470 (Year: 2007).*

*Primary Examiner* — Matthew M Kim
*Assistant Examiner* — Indranil Chowdhury
(74) *Attorney, Agent, or Firm* — Schwabe Williamson & Wyatt

(57) ABSTRACT

Among other things, embodiments of the present disclosure relate to detecting performance degradation in database systems. For example, some embodiments of the present disclosure help to identify events associated with anomalous database system parameter states and assess the severity of such anomalous events. Other embodiments may be described and/or claimed.

16 Claims, 5 Drawing Sheets

(56) References Cited

U.S. PATENT DOCUMENTS

| | | |
|---|---|---|
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,038,707 B2 * | 7/2018 | Muddu ............... H04L 63/1425 |
| 10,248,533 B1 * | 4/2019 | Shah ................... G06F 11/3452 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |

(56) References Cited

U.S. PATENT DOCUMENTS

| | | | |
|---|---|---|---|
| 2011/0098973 A1* | 4/2011 | Seidman | G06F 11/3409 |
| | | | 702/179 |
| 2011/0218958 A1 | 9/2011 | Warshaysky | |
| 2011/0247051 A1 | 10/2011 | Bulumulla | |
| 2012/0023375 A1* | 1/2012 | Dutta | G06F 11/0754 |
| | | | 714/47.2 |
| 2012/0042218 A1 | 2/2012 | Cinarkaya | |
| 2012/0233137 A1 | 9/2012 | Jakobson et al. | |
| 2012/0290407 A1 | 11/2012 | Hubbard et al. | |
| 2013/0204948 A1* | 8/2013 | Zeyliger | G06F 11/328 |
| | | | 709/206 |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya | |
| 2013/0254387 A1* | 9/2013 | Yancey | G06F 15/173 |
| | | | 709/224 |
| 2014/0359537 A1 | 12/2014 | Jackobson et al. | |
| 2015/0163121 A1* | 6/2015 | Mahaffey | H04L 63/1425 |
| | | | 707/687 |
| 2016/0078120 A1* | 3/2016 | Pradeep | G06F 16/173 |
| | | | 707/737 |
| 2016/0350173 A1* | 12/2016 | Ahad | G06F 11/3072 |
| 2017/0161131 A1* | 6/2017 | Noll | H04L 67/1097 |
| 2018/0039555 A1* | 2/2018 | Salunke | G06F 11/3034 |
| 2019/0007432 A1* | 1/2019 | Tauschinsky | H04L 63/1425 |
| 2019/0138643 A1* | 5/2019 | Saini | G06F 16/248 |
| 2019/0173765 A1 | 6/2019 | Bertran et al. | |
| 2020/0242532 A1* | 7/2020 | Kawamoto | H04L 67/10 |

\* cited by examiner

US 11,055,162 B2

DATABASE SYSTEM PERFORMANCE DEGRADATION DETECTION

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

Embodiments of the present disclosure relate to detecting performance degradation in database systems. Other embodiments may be described and/or claimed.

BACKGROUND

Database systems are an important part of many applications. However, the performance of database systems may be adversely affected by anomalous events, and such events may be associated with a degradation or failure of a component of the database system. Among other things, embodiments of the present disclosure help identify the effect of anomalous events on the performance of database systems.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Examples of systems, apparatuses, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatuses, computer-implemented methods, and computer-readable storage media for detecting database system performance degradation.

I. SYSTEM EXAMPLES

Figure 1A:
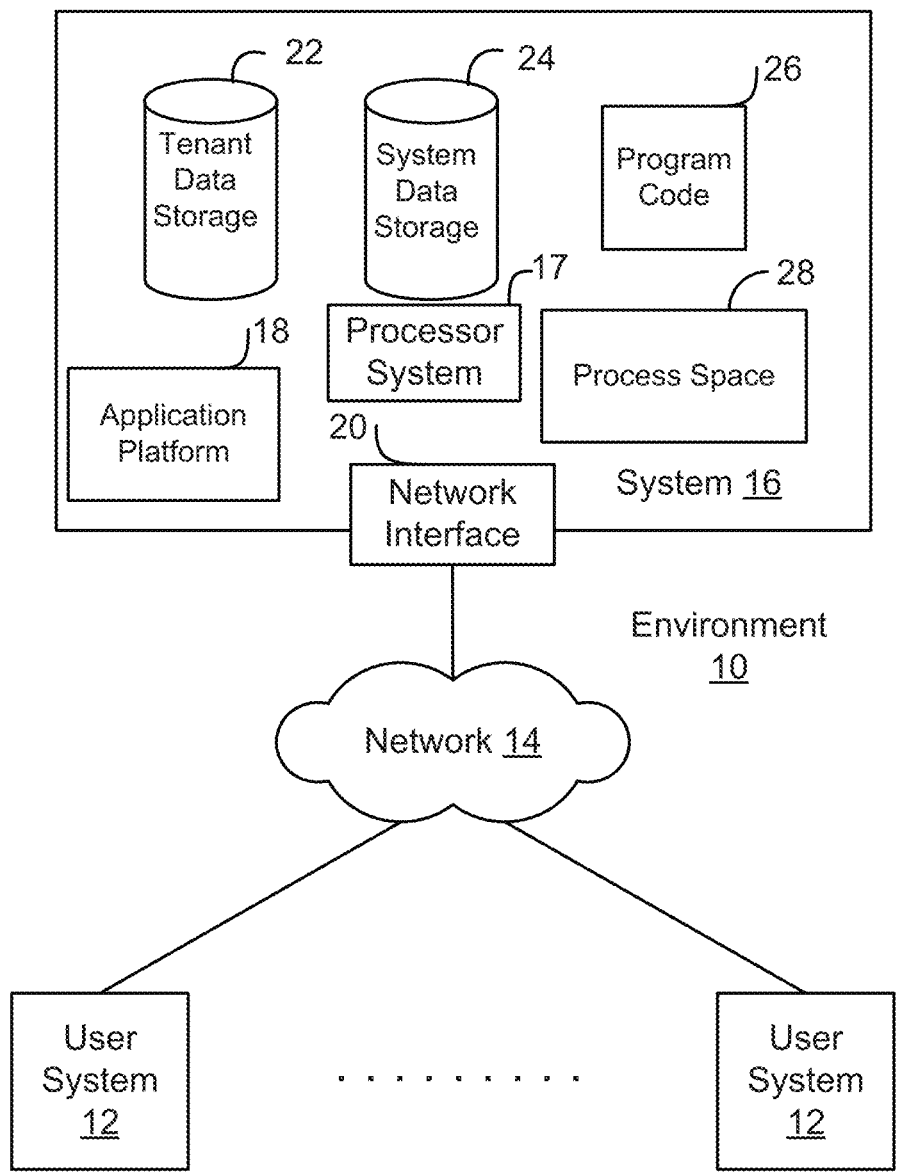
FIG. 1A is a block diagram illustrating an example of an environment in which an on-demand database service can be used according to various embodiments of the present disclosure.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
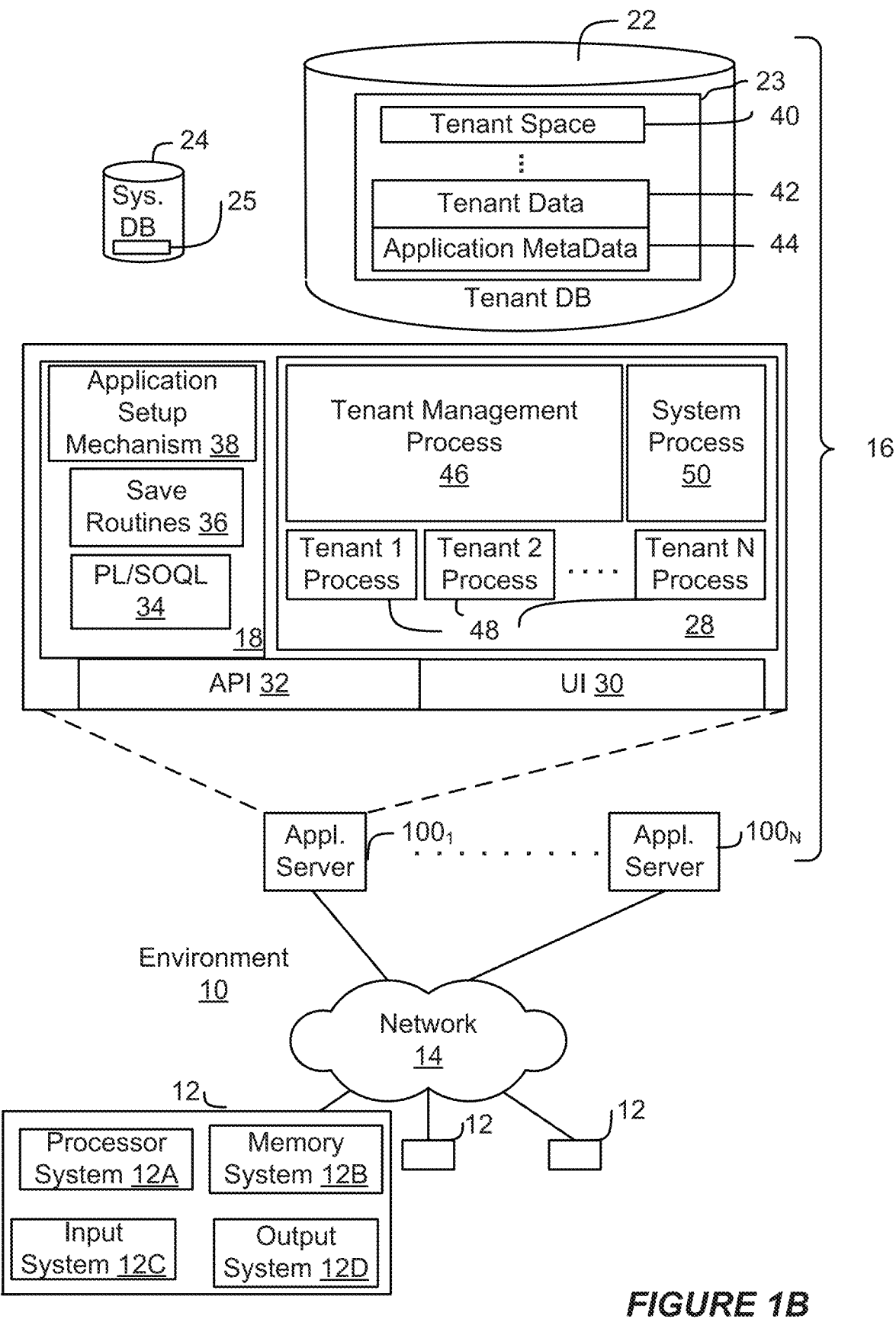
FIG. 1B is a block diagram illustrating examples of implementations of elements of FIG. 1A and examples of interconnections between these elements according to various embodiments of the present disclosure.

FIG. 1B shows a block diagram with examples of implementations of elements of FIG. 1A and examples of interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers 1001-100N. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 40, which can be physically or logically arranged or divided. Within each tenant storage space 40, user storage 42 and application metadata 44 can similarly be allocated for each user. For example, a copy of a user's most recently used (MRU) items can be stored to user storage 42. Similarly, a copy of MRU items for an entire organization that is a tenant can be stored to tenant storage space 40.

The process space 28 includes system process space 102, individual tenant process spaces 48 and a tenant management process space 46. The application platform 18 includes an application setup mechanism 38 that supports application developers' creation and management of applications. Such applications and others can be saved as metadata into tenant database 22 by save routines 36 for execution by subscribers as one or more tenant process spaces 48 managed by tenant management process 46, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 44 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server 100₁ can be coupled via the network 14 (for example, the Internet), another application server 100N-1 can be coupled via a direct network link, and another application server 100N can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example of a storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of an MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. DETECTING DATABASE SYSTEM PERFORMANCE DEGRADATION

Among other things, embodiments of the present disclosure help to identify events associated with anomalous database system parameter states and assess the severity of such anomalous events.

Figure 2:
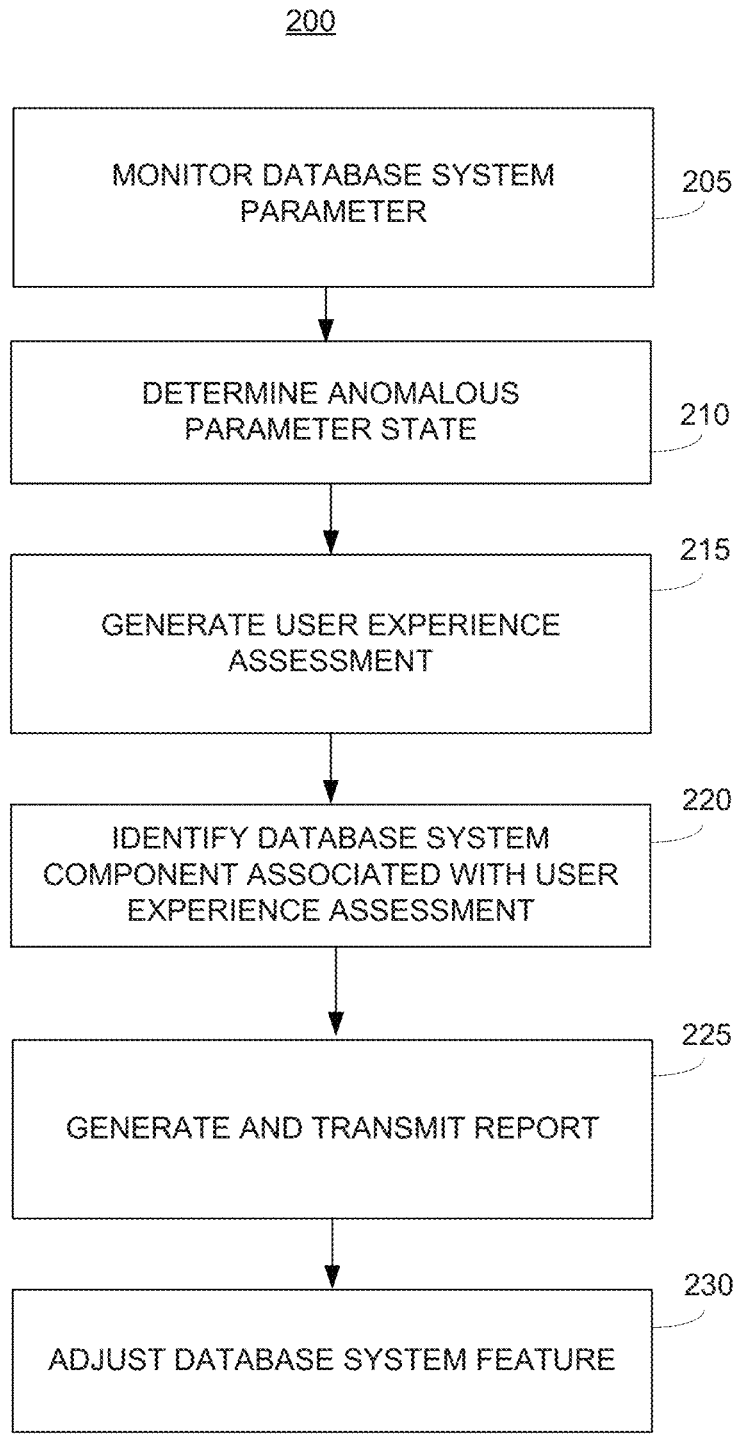
FIG. 2 is a flow diagram illustrating an example of a process according to various embodiments of the present disclosure.

FIG. 2 is a flow diagram illustrating an example of a process 200 according to various aspects of the present disclosure. Any combination and/or subset of the elements of the methods depicted herein (including method 200 in FIG. 2 and method 300 in FIG. 3) may be combined with each other, selectively performed or not performed based on various conditions, repeated any desired number of times, and practiced in any suitable order and in conjunction with any suitable system, device, and/or process. The methods described and depicted herein can be implemented in any suitable manner, such as through software operating on one or more computer systems. The software may comprise computer-readable instructions stored in a tangible computer-readable medium (such as the memory of a computer system) and can be executed by one or more processors to perform the methods of various embodiments. In some embodiments, for example, methods 200 and 300 may be performed by database system 16 illustrated in FIGS. 1A and 1B and described above.

In this example, process 200 includes monitoring (205) the state of one or more parameters associated with a database system, determining an anomalous state (relative to a baseline state) for one or more of the monitored parameters (210), and generating a user experience assessment (215) reflecting the magnitude of the one or more anomalous states on the utilization of the database system by one or more users. Process 200 further includes identifying a component of the database system associated with the user experience assessment (220), generating and transmitting a report (225) containing information regarding the user experience assessment, and adjusting a feature of the database system (230) based on the user experience assessment.

Embodiments of the present disclosure may monitor (205) a variety of different parameters to determine anomalous parameter states (210). For example, one class of parameters (also referred to herein as "metrics") that may be monitored may be referred to herein as "performance parameters" reflecting a performance aspect of the database system. Examples of performance parameters/metrics include metrics such as database trust time and/or asynchronous or synchronous database request time. Other performance metrics (e.g., reflecting the speed and/or efficiency of the database system may also be monitored).

Another example of a class of parameters/metrics that may be monitored according to various embodiments includes "infrastructure parameters," which may also be referred to as "load metrics/parameters." Infrastructure metrics monitored by the system may reflect the utilization of one or more components of the database system, such as processor utilization (e.g., regarding the database's CPU), workload concurrency (such as average active sessions and/or connection pool thread starvation rates), network utilization, memory utilization, and others. Parameters may be monitored periodically as well as in response to an event (e.g., a change in a parameter from a previous state). Parameters may also be monitored in real-time or near-real-time.

The system may determine anomalies (210) based on the monitored parameters. For example, anomalies may be determined based on a deviation of the monitored parameter from a baseline state (also referred to as a "typical state"). Anomalies may also be determined in response to a parameter meeting or exceeding a predetermined threshold, as well as a parameter reaching a predetermined state a predetermined number of times or having a particular state for a predetermined period of time. For example, a baseline states for a performance parameter associated with a hardware or software component of the database system (e.g., processor execution time for a processor) may be identified from a manufacturer's specification associated with the component. The baseline state for a parameter may also be identified based on monitoring (205) the state of a parameter over time and/or over a plurality of different database systems.

Method 200 further includes generating a user experience assessment (215) reflecting the magnitude the anomalous states have on utilizing the database system by one or more users. In some embodiments, for example, the user experience assessment may be generated as a numerical score. Additionally or alternatively, the user experience assessment may be represented alphanumerically or using any other suitable scale (e.g., "poor," "fair," "good," "excellent"). In some embodiments, as discussed in more detail below, a numerical user experience assessment may be normalized.

In some embodiments, the user experience assessment may be generated based on any number of anomalous determined states (including no anomalous states detected). Continuing the examples above, a user experience assessment generated without any anomalous events could be described as "excellent" (or, for example, with a normalized numerical score of 1) while a user experience assessment generated based on multiple anomalous events might be described as "poor" (or, for example, with a normalized numerical score of 0.1).

In some embodiments, the user experience assessment may be generated in response to a predetermined number of anomalous states being detected. Additionally or alternatively, the user experience assessment may be generated in response to at least a predetermined number of anomalous states being determined among different classes of monitored parameters.

In one embodiment, for example, the system may only regard anomalous states as representing an actual degradation in user/customer experience if at least two classes/sets of metrics (e.g., at least one infrastructure parameter and at least one performance parameter) experience anomalies.

Anomalous events may be determined based on monitoring one or more parameters over a predetermined time interval (e.g., ten seconds, five minutes, one month, etc.). In some embodiments, as described in more detail below, the system may generate a score for each determined anomalous state (also referred to herein as an "anomalous event"). The scores for each anomalous event may in turn be used to determine the user experience assessment.

In some embodiments, multiple user experience assessments (e.g., taken over a predetermined time period, such as one week intervals) can be analyzed to determine if there is an increase (or decrease) in the performance of the database system (e.g., from week to week), as well as if there is a particular host or sub-component that might be problematic within the system.

Embodiments of the present disclosure may determine anomalous parameter states in a variety of ways. In some embodiments, for example, the system may use a combination of explanatory data modeling and Seasonal Hybrid ESD (S-H-ESD). Explanatory data modeling may be first be used to predict one variable based on other variables, and points in the predicted variable that are not explained by the other variables may be flagged. S-H-ESD may then be used on the predicted variable alone to determine anomalies with respect to that variable (e.g., points that are significantly deviating from the expected residuals after one removes the trends and the seasonal patterns). In some embodiments, the system may only keep the points as anomalies in the S-H-ESD analysis that are also flagged by the explanatory data modeling. In this way, embodiments of the present disclosure can better identify points that are anomalies and are not explained by the other demand/usage metrics.

In some embodiments, the system may expand and evaluate adjacent anomaly points for different classes of parameters (e.g., the "infrastructure/load metrics") to get an event window of "incidents" by grouping together anomaly points that are not separated by more than a certain time interval. This time interval may be determined by a varying inertia of the anomalies. In this manner, embodiments of the present disclosure help address the complexity of infrastructure anomalies impacting the latency of user/customer requests, which may result in varying degrees of offset on the timeline of events. To address the variance, the interval used to group anomalies may be set longer or shorter, based on the degree of anomalies (e.g., higher degree anomalies may be grouped into a longer or shorter interval relative to lower degree anomalies, or vice versa).

As noted above, each anomalous event may be scored. In some embodiments, for example, each anomalous state may be weighted, and a respective event score determined for each anomalous state. The system may score the events by first weighting the points within an event window using a gain function. In one embodiment, the system multiplies the utilization value at each point in the event window by the appropriate gain and then sums the results to determine the user experience assessment.

Figure 3:
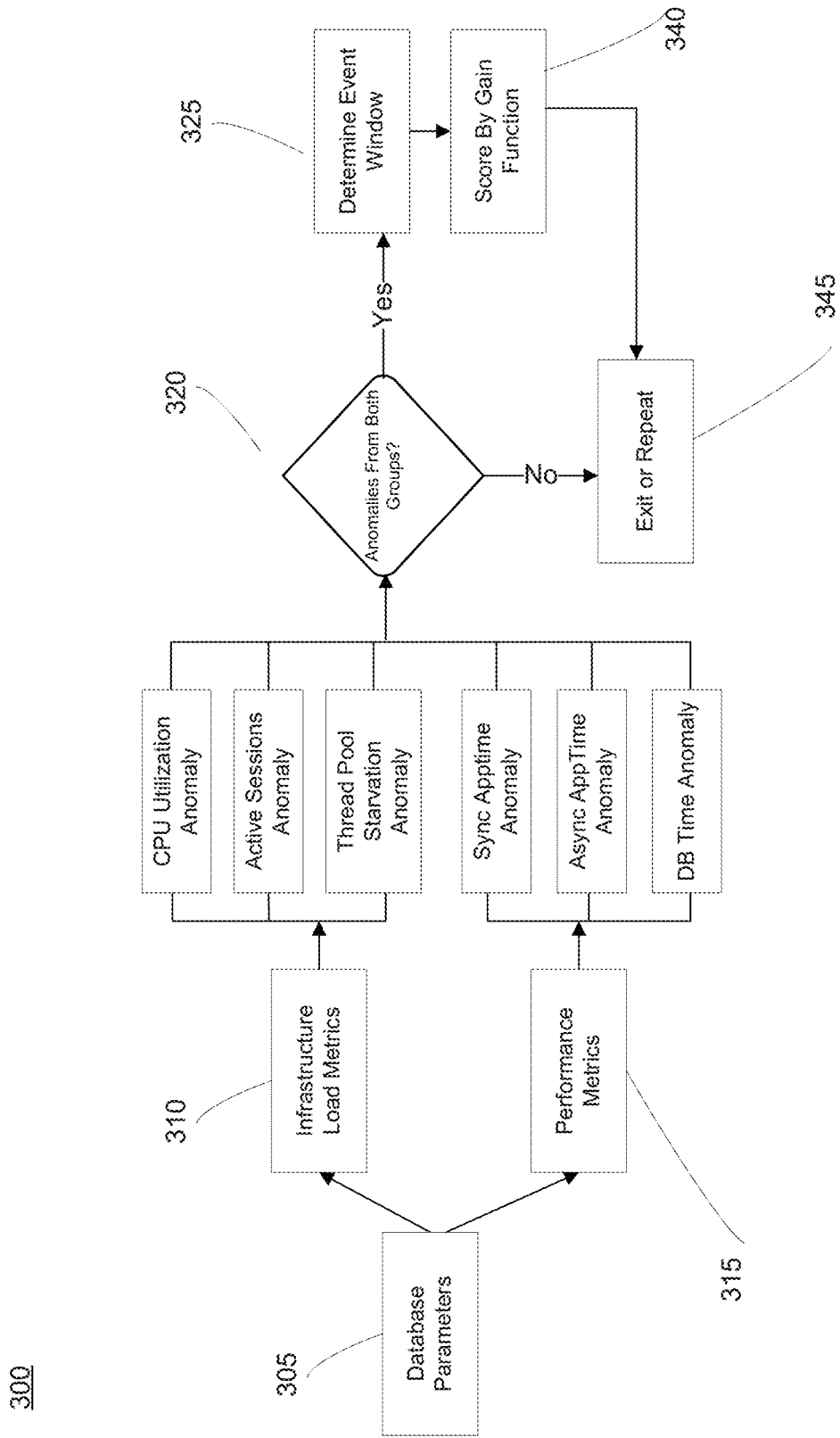
FIG. 3 is a flow diagram illustrating another example of a process according to various embodiments of the present disclosure.

FIG. 3 depicts an example of another process according to various embodiments of the disclosure. In this example, process 300 includes retrieving a plurality of input database parameters (at block 305), which comprise a set of infrastructure load metrics (block 310) and performance metrics (315) that are monitored for anomalies. Examples of anomalies based on the infrastructure load metrics include CPU utilization anomalies, active session anomalies, and thread pool starvation anomalies. Examples of anomalies based on the performance metrics include synchronous and asynchronous application time anomalies, and database time anomalies.

The system may use a variety of anomaly detection methods (including S-H-ESD or one or more other anomaly detection algorithms) over predetermined time intervals (e.g., 1-minute increments). In the example shown in FIG. 3, if there are is least one anomaly from each of the two groups of parameters (infrastructure load metrics and performance metrics), the system confirms a customer-impacting incident at block 320. Otherwise, the windows from step 3 are discarded as false alarms and the process may exit or repeat at block 345.

For confirmed customer-impacting incidents, A collection of anomalies may be identified and anomaly "windows" (with start and end times) are determined by grouping anomaly data points at block 325. A score is determined for each minute-level data point at block 340, where total and average scores (e.g., used to determine the user experience assessment), can be used to prioritize and measure customer impact. The health or performance of a particular node may be determined by calculating the sum of a plurality of numerical user experience assessments for a given period of time.

In some embodiments, the event score and/or the user experience assessment may be normalized. In one embodiment, for example, each event score is normalized to a value between 0 and 1. The gain function used to weight the event points may be based, for example, on a sigmoid (S shaped) function based on data from past incidents to determine the relative effect of different utilization values in terms of latency and incidents experienced by a user/customer of the database system. For example, the gain function may be used to help identify how much more of an effect 100% utilization has on latency as compared to 60%, or 40%. In some embodiments, the parameters of the gain function (e.g., the mid-point of the curve and steepness of the curve) may be revised as the system learns more from new data.

In a particular example, consider a database central processing unit (CPU) utilization parameter monitored according to embodiments of the present disclosure. The CPU utilization parameter (e.g., an "infrastructure parameter" as described above) may be analyzed and, if an anomaly is detected, a score is generated for the anomalous event and normalized with a scale tuned for each metric (with an output between 0.0 and 1.0).

Figure 4:
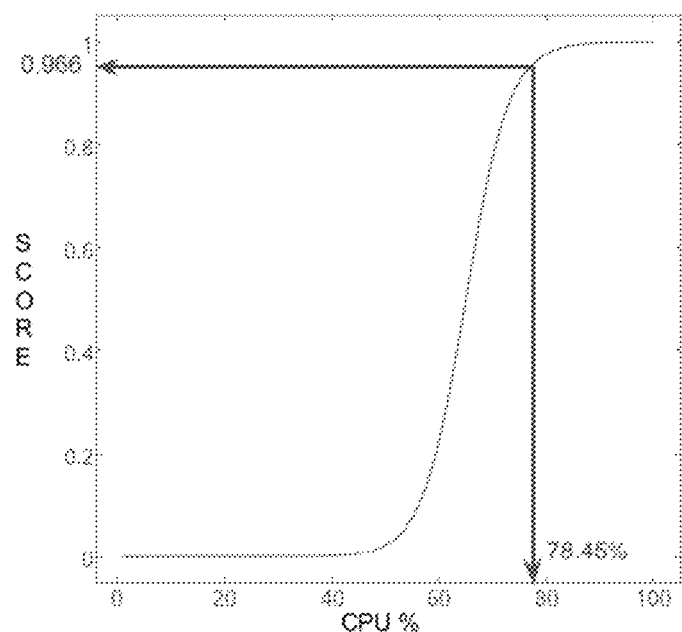
FIG. 4 is a graph illustrating an example of determining a user experience score based on processor utilization according to various embodiments of the present disclosure.

In this example, the scoring scale for the CPU utilization parameter is depicted in FIG. 4 as a Sigmoid function (a.k.a S-Curve), that defines the center point (e.g., 60), and the rate of the curve (e.g., 0.25; lower value relaxed, higher value tighter slope). In addition to CPU utilization, other parameters may likewise be represented, such as an average active sessions count, messaging system latency (e.g., from WEBSPHERE MQ), connection pool metrics, and others. In the particular example depicted in FIG. 4, the sigmoid function reflects that a 78.45% database system CPU utilization translates to a "0.966" normalized score for this event.

Once the event window of incidents is determined, the system may generate and transmit (225) a report containing information regarding the user experience assessment. The report may be transmitted to any suitable system or individual (e.g., a human administrator) using an electronic communication (e.g., an email, SMS text message, data packet, etc.).

The report may provide a variety of information. For example, the report may rank and show the user experience assessments associated with the worst (in terms of degradation to the use of the database system) events in a week (or any other interval). The report may also show the worst hosts over a period of time by accumulating all of the event scores for each host. Similarly, the report may identify the worst pods (comprised of multiple hosts) in a week by aggregating the scores.

The report may also present the change in the user experience score for a database system from one period of time to the next (e.g., from week to week). The report may further flag changes that are significant (e.g., a rise or drop in the user experience assessment above or below a predetermined threshold) based on historical data. Among other things, this helps viewers of the report to get a sense of how the experience of users of the database system is trending. Additionally, the report may present event scores and the user experience assessment at different organization levels (e.g., a group of database systems, one particular system, a component or subcomponent of the database system, etc.) such that if an individual organization is experiencing a degradation in its customer experience it, the degradation is less likely to be overlooked in an average with other organizations that are performing normally.

In contrast to conventional systems, embodiments of the present disclosure can utilize a combination of multiple metrics, and dynamically producing a user experience assessment based on adaptive scoring. Embodiments of the present disclosure can also link the anomalous events in the database system to customer experience degradation as described above. For example, the system may use event windows and weights to reflect the severity of the degradation in the form of normalized scores.

In some embodiments, the system may identify (220), based on a plurality of user experience assessments generated over a predetermined period of time, one or more components of the database system associated with one or more of the user experience assessments. For example, the user experience score may be used to rank incidents by category, such as organizations, hosts, or pods over any timeframe. The system may then identify the component or components (e.g., hardware components or software components) for the worst-ranked anomalous incidents. In this manner, embodiments of the present disclosure can help identify components that may need remediation to stabilize the underlying system. Conventional systems, by contrast, tend to misdiagnose the specific sources of performance degradation, thus leading administrators to over-invest or under-invest in attempting to address issues, since the issues they address may not actually be responsible for customer experience degradation.

In some embodiments, the system may increase or decrease the predetermined time period over which user experience assessments are evaluated to help identify the component(s) associated with an anomalous event and/or having the largest impact on a user experience assessment. For example, the system may utilize a relatively shorter time period to identify a relatively acute anomaly (e.g., a hardware component that has failed). By contrast, the system may extend the time period over which user experience assessments are analyzed to identify the source of a more subtle anomaly (e.g., a software component having a bug that causes it to perform improperly 1% of the time).

Embodiments of the present disclosure may automatically adjust a feature of the database system based on a user experience assessment in order to help mitigate an anomalous event that is degrading the performance of the database system. For example, adjusting a feature of the database system may include throttling a request to the database system, re-routing a request to the database system to another database system, queueing a request to the database system, and increasing or decreasing available infrastructure (such as memory, CPU bandwidth, network resources, etc.) for the database system.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A database system comprising:
a processor; and
memory coupled to the processor and storing instructions that, when executed by the processor, cause the database system to perform operations comprising:
monitoring a respective state for each of a plurality of infrastructure parameters associated with the database system;
monitoring a respective state for each of a plurality of performance parameters associated with the database system;
determining the monitored state of at least one infrastructure parameter is anomalous relative to a baseline state for the at least one infrastructure parameter, and the monitored state of at least one performance parameter is anomalous relative to a baseline state for the at least one performance parameter; and
generating, based on determining an anomalous monitored state for the at least one infrastructure parameter and the at least one performance parameter, a user experience assessment reflecting a magnitude of the anomalous monitored states on utilizing the database system by one or more users, wherein generating the user experience assessment includes weighting each of the plurality of anomalous states and determining a respective event score for each of the plurality of weighted anomalous states, and wherein determining the anomalous monitored state for the at least one infrastructure parameter or the at least one performance parameter includes:
  predicting, based on an explanatory data model, one variable based on a plurality of other variables;
  flagging an anomaly point in the predicted one variable; and
  determining the anomalous monitored state based on a seasonal hybrid extreme studentized deviate (S-H-ESD) test applied to the predicted one variable.

2. The database system of claim 1, wherein an anomalous state is determined for both the at least one infrastructure parameter and the at least one performance parameter.

3. The database system of claim 1, wherein determining the anomalous states is based on monitoring the state of the at least one infrastructure parameter and the state of the at least one performance parameter over a predetermined time period.

4. The database system of claim 3, wherein generating the user experience assessment is based on a number of anomalous states determined during the predetermined time period.

5. The database system of claim 1, wherein generating the user experience assessment includes normalizing a sum of the event scores for the plurality of weighted anomalous states.

6. The database system of claim 1, wherein the memory further stores instructions for causing the database system to perform operations comprising:
  identifying, based on a plurality of user experience assessments generated over a predetermined time period, a component of the database system associated with one or more of the plurality of user experience assessments.

7. The database system of claim 6, wherein the component of the database system includes one or more of: a hardware component, and a software component.

8. The database system of claim 6, wherein identifying the database system component includes increasing or decreasing the predetermined time period based on a respective magnitude of each of the plurality of user experience assessments.

9. The database system of claim 1, wherein the memory further stores instructions for causing the database system to perform operations comprising:
  generating and transmitting a report containing a ranked list of a plurality of user experience assessments generated over a predetermined time period.

10. The database system of claim 1, wherein generating the user experience assessment includes normalizing the user experience assessment.

11. The database system of claim 1, wherein the at least one infrastructure parameter includes one or more of: an active session metric, a processor utilization metric, a workload concurrency metric, a memory utilization metric, and a connection pool thread starvation rate.

12. The database system of claim 1, wherein the at least one performance parameter includes one or more of: a database trust time metric, and an asynchronous database request time metric.

13. The database system of claim 1, wherein the memory further stores instructions for causing the database system to perform operations comprising:
  adjusting, based on the user experience assessment, a feature of the database system.

14. The database system of claim 13, wherein adjusting the feature of the database system includes one or more of: throttling a request to the database system, re-routing a request to the database system to another database system, queueing a request to the database system, and increasing or decreasing available infrastructure for the database system.

15. A tangible, non-transitory computer-readable medium storing instructions that, when executed by a database system, cause the database system to perform operations comprising:
  monitoring a respective state for each of a plurality of infrastructure parameters associated with the database system;
  monitoring a respective state for each of a plurality of performance parameters associated with the database system;
  determining the monitored state of at least one infrastructure parameter is anomalous relative to a baseline state for the at least one infrastructure parameter, and the monitored state of at least one performance parameter is anomalous relative to a baseline state for the at least one performance parameter; and
  generating, based on determining an anomalous monitored state for the at least one infrastructure parameter and the at least one performance parameter, a user experience assessment reflecting a magnitude of the anomalous monitored states on utilizing the database system by one or more users, wherein generating the user experience assessment includes weighting each of the plurality of anomalous states and determining a respective event score for each of the plurality of weighted anomalous states, and wherein determining the anomalous monitored state for the at least one infrastructure parameter or the at least one performance parameter includes:
    predicting, based on an explanatory data model, one variable based on a plurality of other variables;
    flagging an anomaly point in the predicted one variable; and
    determining the anomalous monitored state based on a seasonal hybrid extreme studentized deviate (S-H-ESD) test applied to the predicted one variable.

16. A method comprising:
  monitoring, by a database system, a respective state for each of a plurality of infrastructure parameters associated with the database system;
  monitoring, by the database system, a respective state for each of a plurality of performance parameters associated with the database system;
  determining, by the database system, the monitored state of at least one infrastructure parameter is anomalous relative to a baseline state for the at least one infrastructure parameter, and the monitored state of at least one performance parameter is anomalous relative to a baseline state for the at least one performance parameter; and
  generating, by the database system and based on determining an anomalous monitored state for the at least one infrastructure parameter and the at least one performance parameter, a user experience assessment reflecting a magnitude of the anomalous monitored states on utilizing the database system by one or more users, wherein generating the user experience assessment includes weighting each of the plurality of anomalous states and determining a respective event score for each of the plurality of weighted anomalous states, and wherein determining the anomalous monitored state for the at least one infrastructure parameter or the at least one performance parameter includes:

predicting, based on an explanatory data model, one variable based on a plurality of other variables;

flagging an anomaly point in the predicted one variable; and determining the anomalous monitored state based on a seasonal hybrid extreme studentized deviate (S-H-ESD) test applied to the predicted one variable.

* * * * *